Dec. 13, 1927.
G. F. NEVIN ET AL
1,652,578
ROCK DRILL BIT
Original Filed May 9, 1925
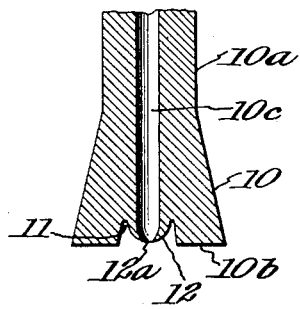
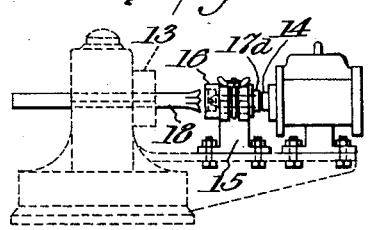
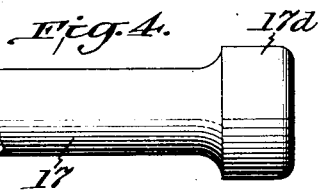
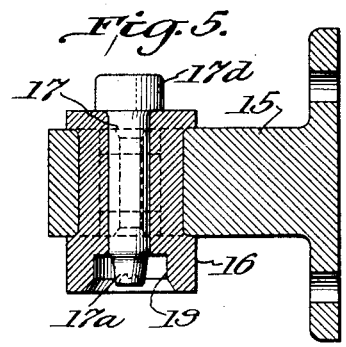
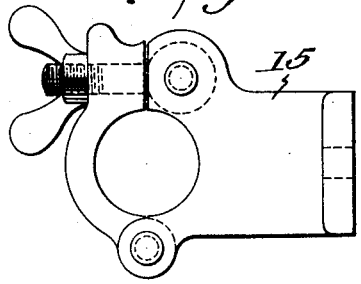
Inventors:
George F. Nevin,
John Goodland Jr.,
By Byrnes Townsend & Brickenstein,
Attorneys.

Patented Dec. 13, 1927.

1,652,578

UNITED STATES PATENT OFFICE.

GEORGE F. NEVIN AND JOHN GOODLAND, JR., OF BUTTE, MONTANA.

ROCK-DRILL BIT.

Original application filed May 9, 1925, Serial No. 29,190. Divided and this application filed March 15, 1926. Serial No. 94,877.

This application is a division of application Ser. No. 29,190, filed May 9, 1925, and the present invention relates to rock drill bits and more particularly to rock drills of the type having a central channel through which water is forced to clear away rock chips and dust. As is well known, the channels become frequently clogged and thereby inoperative.

An object of the invention is to provide a drill bit in which the channel is substantially non-plugging. More specifically, an object is to provide a drill bit having a longitudinal channel, the inner end of which is constricted to make it non-plugging.

For a clear understanding of the invention, reference is made to the accompanying drawings in which:

Figs. 1 and 2 are a section and an end view, respectively, of a drill bit embodying the invention;

Fig. 3 is a more or less diagrammatic representation of an arrangement for carrying out the object of the invention;

Fig. 4 is an elevation, partly in section, of a tool, more particularly identified with the invention;

Fig. 5 is a sectional view on an enlarged scale of detail shown in Fig. 3; and

Fig. 6 is an end view of an auxiliary part shown in Figs. 3 and 5.

The general construction of the drill bit is similar to that of known types of impact rock drill bits. The head 10 of the drill bit flares outwardly from the shank $10^a$ and terminates in a plurality of radially disposed cutting edges $10^b$ which extend inwardly from the outer edge of the head 10. Water is forced through the central channel $10^c$ during the drilling operation to lay the dust and to force the rock cuttings from the drill hole. In the center of the cutting surface of the bit is formed a cup depression 11 defining an annular fin 12 swaged inwardly leaving a constricted passage $12^a$. As appears from the drawing, the fin 12 terminates in a relatively sharp edge which makes it practically impossible for chips and dust to be packed or wedged in the passage $12^a$ or for larger chips to work back into the channel $10^c$.

In Fig. 3 is represented mechanism for forming the drill bit, which mechanism includes the usual chuck 13 for holding the drill bit during the sharpening operation and the usual pneumatic hammer or the like 14 for operating a sharpening tool. These elements are part of the ordinary drill bit sharpening mechanism and do not form part of the invention proper. However, the invention is specially correlated to these elements so as to reduce the mechanism for providing the constriction to a practical minimum.

Between the pneumatic hammer 14 and the chuck is interposed a clamping standard 15 for holding a bushing 16 which acts as a bearing for the dolly 17. The dolly 17 has a cup-forming end $17^a$ defined by a bowl-shaped depression $17^b$ in the center of which is a pin-like projection $17^c$. The dolly is made of tool steel or the like.

The operation of forming the drill bit with this particular mechanism is as follows:

The drill bit 18 is placed, while hot, in the chuck, as shown in Fig. 3, so that it just comes in contact with the countersunk face of the bushing 16. Air is admitted to the pneumatic hammer and the hammer strikes against the head $17^d$ of the dolly. The latter is driven forward by the hammer until the shoulder formed by the head $17^d$ comes in contact with the bushing which stops the movement of the dolly and the cupping operation is completed.

The cup-shaping portion $17^a$ is forced into the relatively softer steel of the drill bit and swages the resulting annular fin inwardly to a relatively sharp edge while the pin-shaped projection $17^c$ uniformly limits the movement of the fin and defines the constricted passage $12^a$.

In practice, the operation described ordinarily follows the sharpening operation. The standard 15 may be permanently fixed in position. To carry out the sharpening operation, the dolly 17 and the bushing 16 are first removed and after the drill steel is sharpened, they are re-inserted to carry out the operation as above described.

The recess 19 of the dolly bushing also acts as a gauge for the rock drill bit. In practice the outer surface of the cup-forming portion is slightly tapered. The dolly therefore also acts upon the drill steel to force the cutting portions $10^b$ outwardly into engagement with the wall of the recess 19 whereby the cutting edges are centered. It is understood that for each size of drill bit a corresponding bushing is used.

We claim:

1. An impact rock drill bit of the type having a flaring head terminating in a plurality of radially disposed cutting edges and having a central channel therethrough, characterized by a circular fin on the bit at the mouth of the channel, concentrically disposed relatively to the latter and bent into the channel to constrict the same.

2. An impact rock drill bit comprising a shank having a central channel, a plurality of radially disposed cutting edges, and a wall spaced from the inner ends of said cutting edges and providing a restricted outlet for said channel.

3. An impact rock drill bit comprising a shank having a central channel, a plurality of radially disposed cutting edges having their inner ends spaced from the axis of said shank, and a wall disposed in the space between the inner ends of said cutting edges, said wall having a sharp-edged opening therethrough of less diameter than the diameter of said channel.

In testimony whereof, we affix our signatures.

GEORGE F. NEVIN.
JOHN GOODLAND, Jr.